May 16, 1950  F. M. WELSHANS ET AL  2,507,655
FRUIT PICKER
Filed March 2, 1948
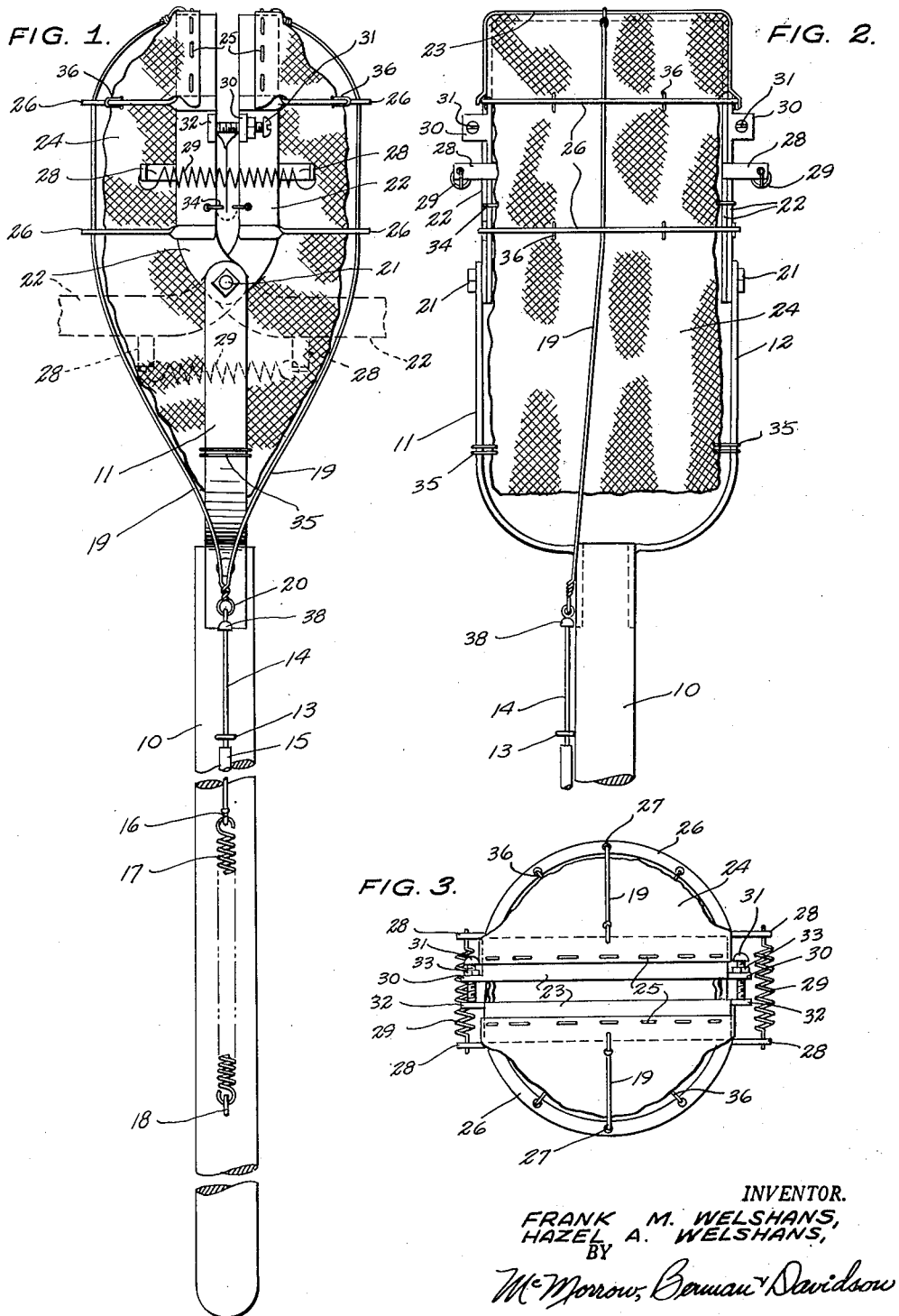
INVENTOR.
FRANK M. WELSHANS,
HAZEL A. WELSHANS,
BY
McMorrow, Berman & Davidson
ATTORNEYS.

Patented May 16, 1950

2,507,655

UNITED STATES PATENT OFFICE 2,507,655

FRUIT PICKER

Frank M. Weishans and Hazel A. Weishans, Percy, Ill.

Application March 2, 1948, Serial No. 12,556

5 Claims. (Cl. 56—333)

Our invention relates to fruit pickers, and more particularly to fruit pickers of the type which include an elongated pole having a receptacle for fruit carried by one end of the pole, and which receptacle is operatively connected to a pair of jaws which are adapted to be opened and closed against the pressure of a spring to pick fruit remote from the picker operator.

With the foregoing in view, an object of our invention is to provide an improved fruit picker of the class described.

A further object is to provide an improved fruit picker of the class described, which picker includes means mounting said jaws for opening movement past a dead center, whereby said spring means is effective to lock said jaws in an open position.

A further object is to provide an improved fruit picker of the class described which includes at least one adjustable limit stop carried by one of the jaws and engageable with the other jaw to limit closing movement of said jaws.

Other objects and advantages reside in the particular structure of the invention, combination and arrangement of the several parts, in the particular construction of the several parts, and will be readily understood by those skilled in the art upon reference to the accompanying drawing in connection with the following specification, wherein the invention is shown, described and claimed.

In the drawing:

Figure 1 is a side view of a picker according to our invention, parts of the handle being broken away for clarity;

Figure 2 is a view like Figure 1, but taken at right angles thereto looking from the right of Figure 1;

Figure 3 is a plan view of the invention.

Referring specifically to the drawing, wherein like reference characters have been used throughout the several views to designate like parts, 10 designates an elongated pole of any suitable length comprising a handle for the picker. One end of the pole 10 has secured thereto in any suitable manner a pair of arms 11 and 12 comprising a yoke extending forwardly of said end of the pole. The pole 10 has mounted thereon in longitudinal alignment a plurality of guides 13, only one of which is shown, for slidably mounting a wire-actuating member 14 on the pole. The wire 14 may be covered at intermediate portions of its length with a grip-providing sheath 15. A convenient way of providing the wire is to remove the insulation from end portions of heavy single-strand electric wire having an insulating sheath formed thereon. The rear end of the wire 14 is suitably connected in any suitable manner, as at 16, to the forward end of a coil spring 17. The rear end of the coil spring 17 is connected by any suitable means 18 to a rear portion of the handle or pole 10, whereby to impart a constant tension to the wire 14. The purpose of this arrangement will be apparent later. The forward end of the wire 14 is suitably connected in any suitable manner, as by the universal coupling 20, to the bight of the yoke including arms 19 which are disposed in 90° offset relation to the arms 11 and 12 of the first-mentioned yoke.

The forward free ends of the arms 11 and 12 of the first yoke are pivoted in any suitable manner, as at 21, to the free ends of a pair of like and substantially U-shaped jaws. The legs 22 of such jaws terminate forwardly in straight cross-pieces 23 which are suitably connected in any suitable manner, as at 25, to the mouth portion of any suitable fruit receptacle 24. The receptacle 24 is preferably formed of fabric material and is adapted to hold a number of pieces of fruit at one time. The forward ends of the arms 19 of the second yoke are secured in any suitable manner to the cross-pieces 23 intermediate the ends of the latter. In this connection, it is noted that the second yoke preferably comprises flexible wire arms 19 for a purpose to be apparent later. The legs 22 of each jaw are connected together by one, and preferably two, laterally outwardly-directed or bowed limb guards 26. Such guards 26 prevent fruit in the receptacle 24 from being bruised while the picker is being extended to engage additional fruit. Moreover, the guards 26 are formed to provide guide-providing apertures 27 therethrough which slidably receive the arms 19 of the second yoke therein to guide the latter as the jaws are opened and closed.

Each leg 22 of each jaw also has mounted thereon a laterally outwardly-directed bracket 28 to which suitable tension springs 29 are secured to normally load the jaws in closing directions. However, as is illustrated in broken lines, Figure 1, when the jaws are swung to the broken line position, they pass a dead center whereby the springs 29 are effective to load the jaws in an open direction and/or position, whereby fruit contained in the receptacle 24 is readily removed therefrom. At least one of the legs 22 of one of the jaws is provided with a lug 30 which threadedly mounts an adjustable limit stop 31 therein for engagement with a lug 32 of the opposite jaw to limit closing movement of the jaws to a desired degree.

Any suitable lock nut 33 carried by the limit stop 31 is engageable with the lug 30 to lock the limit stops in an adjusted position. Additional fastening means 34 and 35 and also 36 may be utilized to secure the receptacle 24 to the legs 22 of the jaws, the arms 11 and 12 of the first yoke, and to the limb guards 26.

In the operation of the device, the operator of the picker opens the jaws thereof by pulling laterally on the wire 14 at any point between the forward end or the rear end when the jaws have been positioned adjacent the fruit to be picked. Then, with the fruit positioned within the receptacle 24, the wire 14 is released and the springs 29 close the jaws to secure the fruit in the receptacle. A back pull on the pole 10 removes the fruit from its limb. By providing a flexible wire 14, the operator of the picker may actuate the same from any position along the pole 10 simply by pulling laterally outwardly of the same. When the receptacle 24 is filled with fruit, the same is returned to the vicinity of the operator who then opens the jaws past the dead center, as illustrated in broken lines, Figure 1, whereby the fruit is readily removed from the receptacle. In this connection, it should be noted that the wire 14 is provided adjacent its forward end with a limit stop 38 which engages with the first guide member 13 to limit opening of the jaws by a pull on the wire. Thus, the operator for the picker is unable to open the jaws past the dead center by pulling on the wire, whereby there is no danger of fruit being accidentally spilled from the receptacle 24 while the device is being used to pick fruit. At the same time, the flexibility of the second yoke arms 19 permits the jaws to be manually moved to the beyond-dead-center position when the receptacle is to be emptied. The limb guards 26, as aforesaid, protect fruit in the receptacle from being bruised by intermediate limbs as the picker is being extended to pick new fruit or being retracted through the tree. The limit stops or stop 31 normally maintain the jaws slightly spaced apart, whereby to avoid bruising of small twigs or limbs accidentally grasped by the jaws in use. In this connection, the jaws, particularly the cross-pieces 23 thereof, are preferably blunt to avoid bruising the bark of limbs of trees encountered in use.

While we have shown and described what is now thought to be the preferred embodiment of the invention, it is to be understood that the same is susceptible of other forms and expressions. Consequently, we do not limit ourselves to the precise structure shown and described hereinabove except as hereinafter claimed.

We claim:

1. A fruit picker including a pole, a receptacle, pivoted jaws carried by said pole and operatively connected to said receptacle to open and close the latter, a bracket mounted on each of said jaws, a spring connecting said brackets, said spring, in the closed position of said jaws, being located on one side of the pivot means for said jaws, and, in the fully open position of said jaws, being located on the other side of the pivot means for said jaws, thus providing an over-center action for said spring which will hold said jaws in either their closed or their open positions.

2. A fruit picker, including a pole, a yoke carried by one end of said pole, said yoke including a pair of spaced-apart arms, a pair of inverted and substantially U-shaped jaw members, each jaw including parallel legs connected at one end by a substantially straight cross-piece, means pivotally connecting like legs of each jaw member to an arm of said yoke, a receptacle of flexible material, said receptacle including a mouth portion, means connecting said jaw members to said mouth portion of said receptacle, to cause said mouth portion to open and close upon opening and closing movement of said jaw members, means connecting said yoke to said receptacle, said like legs of said jaw members including laterally and oppositely directed brackets, a coil spring connecting said brackets of like legs together, said springs, in the closed position of said jaw members, being located on one side of the pivot means for said jaw members, and, in the fully opened position of said jaw members, being located on the other side of said pivot means, thus providing an over-center action on the part of said spring means which will hold said jaw members in either their closed or their open positions.

3. A fruit picker, including a pole, a yoke carried by one end of said pole, said yoke including a pair of spaced-apart arms, a pair of inverted and substantially U-shaped jaw members, each jaw member including parallel legs connected at one end by a substantially straight cross-piece, means pivotally connecting like legs of each jaw member to an arm of said yoke, a receptacle of flexible material, said receptacle including a mouth portion, means connecting said jaw members to said mouth portion of said receptacle, to cause said mouth portion to open and close upon opening and closing movement of said jaw members, means connecting said yoke to said receptacle, said like legs of said jaw members including laterally and oppositely directed brackets, a coil spring connecting said brackets of like legs together, said springs, in the closed position of said jaw members, being located on one side of the pivot means for said jaw members, and, in the fully opened position of said jaw members, being located on the other side of said pivot means, thus providing an over-center action on the part of said spring means which will hold said jaw members in either their closed or their open positions, laterally directed U-shaped guard members mounted on said jaw members, said guard members being disposed outside of said receptacle and being connected at their ends to the legs of the jaw members.

4. A fruit picker, including a pole, a yoke carried by one end of said pole, said yoke including a pair of spaced-apart arms, a pair of inverted and substantially U-shaped jaw members, each jaw member including parallel legs connected at one end by a substantially straight cross-piece, means pivotally connecting like legs of each jaw member to an arm of said yoke, a receptacle of flexible material, said receptacle including a mouth portion, means connecting said jaw members to said mouth portion of said receptacle, to cause said mouth portion to open and close upon opening and closing movement of said jaw members, means connecting said yoke to said receptacle, said like legs of said jaw members including laterally and oppositely directed brackets, a coil spring connecting said brackets of like legs together, said springs, in the closed position of said jaw members, being located on one side of the pivot means for said jaw members, and, in the fully opened position of said jaw members, being located on the other side of said pivot means, thus providing an over-center action on the part of said spring means which will hold said jaw members in either their closed or their open positions, laterally directed U-shaped guard members mounted on said jaw members, said guard members being disposed outside of said receptacle and being connected at their ends to the legs of the jaw members, a second yoke including spaced arms straddling said receptacle in ninety degree offset relation to said first yoke, means pivotally connecting said arms of said second yoke to said cross-pieces of said jaw members, apertures in said guard members, the arms of said second yoke being slidably mounted in said apertures, an actuating wire connected at one end to said second yoke and extending longitudinally along said pole, and spring means connecting the other end of said wire to said pole to tension said wire.

5. A fruit picker, including a pole, a yoke carried by one end of said pole, said yoke including a pair of spaced-apart arms, a pair of inverted and substantially U-shaped jaw members, each jaw member including parallel legs connected at one end by a substantially straight cross-piece, means pivotally connecting like legs of each jaw member to an arm of said yoke, a receptacle of flexible material, said receptacle including a mouth portion, means connecting said jaw members to said mouth portion of said receptacle, to cause said mouth portion to open and close upon opening and closing movement of said jaw members, means connecting said yoke to said receptacle, said like legs of said jaw members including laterally and oppositely directed brackets, a coil spring connecting said brackets of like legs together, said springs, in the closed position of said jaw members, being located on one side of the pivot means for said jaw members, and, in the fully opened position of said jaw members, being located on the other side of said pivot means, thus providing an over-center action on the part of said spring means which will hold said jaw members in either their closed or their open positions, laterally directed U-shaped guard members mounted on said jaw members, said guard members being disposed outside of said receptacle and being connected at their ends to the legs of the jaw members, a second yoke including spaced arms straddling said receptacle in ninety degree offset relation to said first yoke, means pivotally connecting said arms of said second yoke to said cross-pieces of said jaw members, apertures in said guard members, the arms of said second yoke being slidably mounted in said apertures, an actuating wire connected at one end to said second yoke and extending longitudinally along said pole, and spring means connecting the other end of said wire to said pole to tension said wire, said second yoke being formed of flexible material, guides on said pole for said actuating wire, cooperating stop means on said actuating wire and on said pole for limiting the movement of said actuating wire in a jaw-opening direction, and adjustable stop means carried by said jaws for limiting their movement in a closing direction.

FRANK M. WELSHANS.
HAZEL A. WELSHANS.

REFERENCES CITED

The following references are of record in the file of this patent:

UNITED STATES PATENTS

| Number | Name | Date |
|---|---|---|
| 57,731 | Kelsey | Sept. 4, 1866 |
| 240,422 | Jackson | Apr. 19, 1881 |
| 435,206 | Cain | Aug. 26, 1890 |
| 978,683 | Wells | Dec. 13, 1910 |
| 1,107,243 | Adams | Aug. 11, 1914 |

FOREIGN PATENTS

| Number | Country | Date |
|---|---|---|
| 521,433 | Great Britain | May 21, 1940 |